UNITED STATES PATENT OFFICE.

CHARLES LESLIE BONSTEEL, OF MOOSE JAW, SASKATCHEWAN, CANADA.

ALUMINIUM-SOLDER.

1,323,520.   Specification of Letters Patent.   Patented Dec. 2, 1919.

No Drawing.   Application filed January 11, 1919. Serial No. 270,732.

*To all whom it may concern:*

Be it known that I, CHARLES LESLIE BONSTEEL, a subject of the King of Great Britain, and resident of the city of Moose Jaw, Province of Saskatchewan, in the Dominion of Canada, have invented certain new and useful Improvements in Aluminium-Solder, described in the following specification.

The principal objects of this invention are to render it possible to secure aluminium members together by soldering in a manner that will be strong, durable and efficient and to provide a solder which will flow readily and evenly and will produce a joint which will be as strong or stronger than the members united thereby.

The invention consists essentially in the novel admixture of ingredients as hereinafter set forth.

Aluminium has been developed and brought into very extensive use in a comparatively very recent period and its uses have been very greatly developed but there has always been a considerable restriction in its use owing to the fact that hitherto it has been impossible to secure aluminium members together in a thoroughly reliable manner by means of soldering.

Extensive tests have been made of the solder which I have produced and these made under the strictest conditions have shown remarkable results, in that the solder unites with the surface of the metal part and forms a hard, strong joint which under test has held until the metal parts failed.

The composition of my invention is hereinafter stated in definite parts as being found the most suitable, but it must be understood that the proportions may be varied slightly to suit the mixture to varying conditions of use and substitutes may be utilized for certain of the ingredients.

The preferable mixture of proportions are as follows:—block tin, 29 pounds; zinc, 11 pounds, phosphor tin, 2 pounds; aluminium, 2 pounds, bismuth, 2 grains.

In forming this composition it is found that a combination of phosphorus and bismuth forms the most desirable condition for the flowing of the solder and while I find it preferable to introduce the phosphorus in the form of phosphor tin, bar or crystal, it may be introduced in other forms and where the solder is not required to be as hard nor to flow as freely, the phosphorus may be eliminated but in such instance it will be necessary to increase the amount of bismuth and reduce the amount of zinc. The addition of aluminium to the mixture makes it tough and hard and insures a thorough amalgamation of the body of metal to which it is fluxed. In amalgamating these materials the aluminium is preferably melted separate from the other ingredients and introduced thereto when all are in a molten state.

Solder formed of the proportions and materials herein described flows readily at a temperature of 450° Fahrenheit and unites the members through which it flows in a solid and efficient joint.

What I claim as my invention is:—

An aluminium solder, consisting of an admixture of the following ingredients in or about the proportions named, tin, 29 pounds, zinc, 11 pounds, phosphor tin, two pounds. aluminium, two pounds, bismuth, 2 grains.

CHARLES LESLIE BONSTEEL.